United States Patent
Gendler et al.

(10) Patent No.: US 9,360,924 B2
(45) Date of Patent: Jun. 7, 2016

(54) REDUCED POWER MODE OF A CACHE UNIT

(71) Applicant: Intel Corporation, Santa Clara, CA (US)

(72) Inventors: Alexander Gendler, Kiriat Motzkin (IL); Larisa Novakovsky, Haifa (IL); Ariel Sabba, Karmiel (IL); Niv Tokman, Haifa (IL)

(73) Assignee: Intel Corporation, Santa Clara, CA (US)

( * ) Notice: Subject to any disclaimer, the term of this patent is extended or adjusted under 35 U.S.C. 154(b) by 305 days.

(21) Appl. No.: 13/904,055

(22) Filed: May 29, 2013

(65) Prior Publication Data

US 2014/0359330 A1  Dec. 4, 2014

(51) Int. Cl.
*G06F 1/26* (2006.01)
*G06F 1/32* (2006.01)
*G06F 12/08* (2016.01)

(52) U.S. Cl.
CPC ............ *G06F 1/3275* (2013.01); *G06F 1/3206* (2013.01); *G06F 12/0811* (2013.01); *G06F 2201/885* (2013.01); *Y02B 60/1228* (2013.01)

(58) Field of Classification Search
CPC . G06F 1/3206; G06F 1/3275; G06F 12/0811; G06F 12/0888; G06F 12/1054; G06F 2201/885
USPC ........................................ 713/300, 320, 323
See application file for complete search history.

(56) References Cited

U.S. PATENT DOCUMENTS

| | | | |
|---|---|---|---|
| 2006/0075192 A1 | 4/2006 | Golden et al. | |
| 2010/0082905 A1* | 4/2010 | Wilkerson et al. | 711/122 |
| 2011/0055610 A1 | 3/2011 | Chen | |
| 2012/0173907 A1 | 7/2012 | Moses et al. | |
| 2013/0205098 A1* | 8/2013 | Guthrie | G06F 12/0897 711/146 |

OTHER PUBLICATIONS

European Search Report issued in corresponding European Patent Application No. 14166906.9 dated May 15, 2015, (7 pages).
Hyunhee et al., A Leakage-Aware L2 Cache Management Technique for Producer-Consumer Sharing in Low-Power Chip Multiprocessors, Journal of Parallel and Distributed Computing, 2011, vol. 71, No. 12, pp. 1545-1557.

* cited by examiner

*Primary Examiner* — Michael J Brown
(74) *Attorney, Agent, or Firm* — Trop, Pruner & Hu, P.C.

(57) ABSTRACT

In an embodiment, a processor includes a plurality of cores and a cache unit reserved for a first core of the plurality of cores. The cache unit may include a first cache slice, a second cache slice, and power logic to switch operation of the cache unit between a first operating mode and a second operating mode. The first operating mode may include use of both the first cache slice and the second cache slice. The second operating mode may include use of the first cache slice and disabling the second cache slice. Other embodiments are described and claimed.

20 Claims, 10 Drawing Sheets

REDUCED POWER MODE OF A CACHE UNIT

TECHNICAL FIELD

Embodiments relate generally to power management of electronic devices.

BACKGROUND

Conventionally, an electronic device may include one or more reduced power modes, meaning an operating mode in which at least one component of the device is placed in a reduced power state. The use of a reduced power mode may decrease the amount of electrical power consumed in comparison to an "awake" or normal operating mode.

DETAILED DESCRIPTION

Figure 1A:
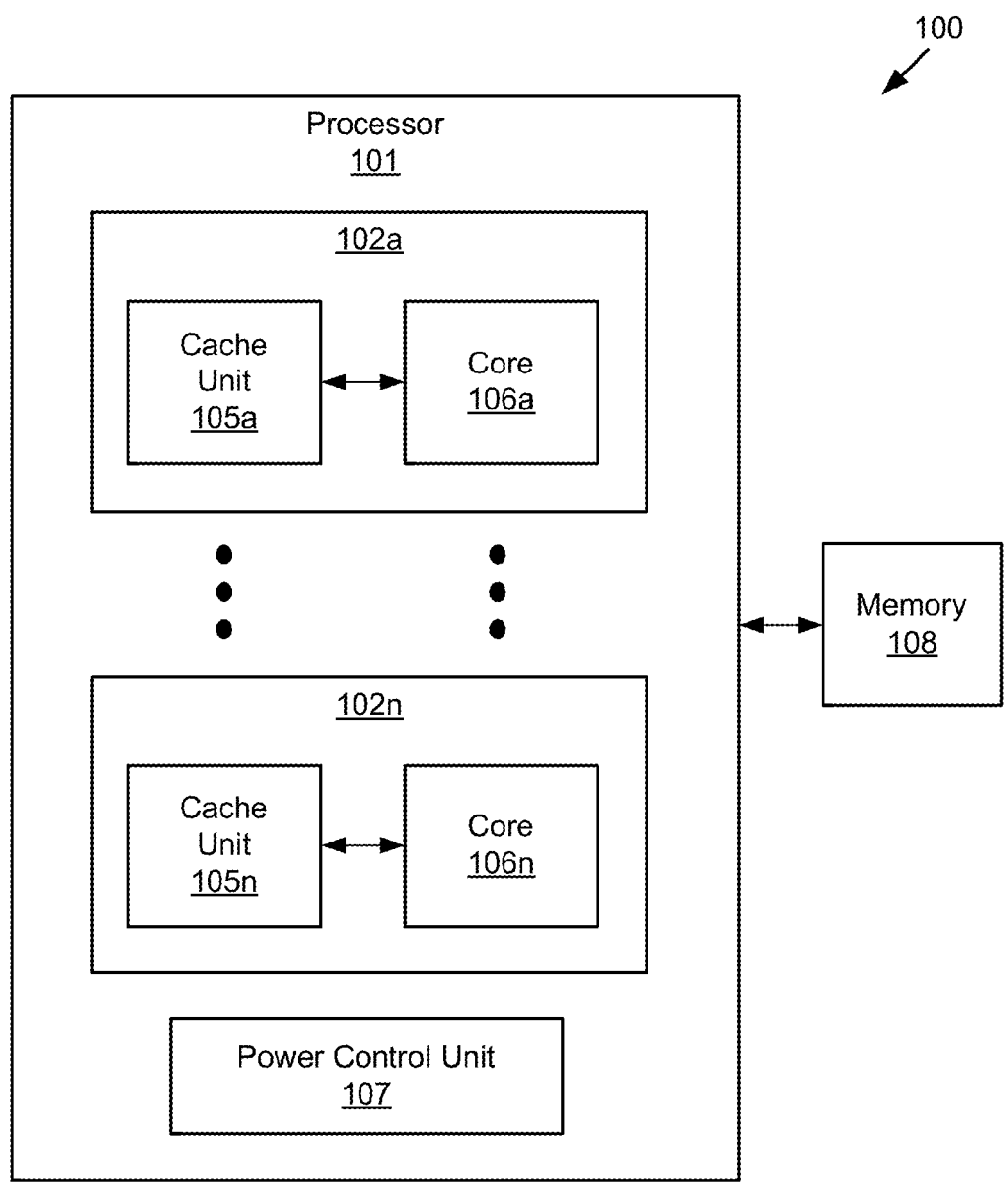
FIGS. 1A-1B are block diagrams in accordance with one or more embodiments.

In accordance with some embodiments, a cache unit associated with a core may include a first cache slice, a second cache slice, and power logic to control the operating mode of the cache unit. In a normal operating mode, the cache unit may use both the first cache slice and the second cache slice. Further, in a reduced power mode, the cache unit may use all or a portion of first cache slice, and may disable the second cache slice. In some embodiments, this reduced power mode may be requested by a power control unit based on a type of processing task to be performed by the core. Accordingly, embodiments may enable reduction in the power consumed by the cache unit.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications typically include a microcontroller, a digital signal processor (DSP), network computers (NetPC), set-top boxes, network hubs, wide area network (WAN) switches, or any other system that can perform the functions and operations taught below.

Moreover, the apparatus, methods, and systems described herein are not limited to physical computing devices, but may also relate to software optimizations for energy conservation and efficiency. As will become readily apparent in the description below, the embodiments of methods, apparatus, and systems described herein (whether in reference to hardware, firmware, software, or a combination thereof) are vital to a 'green technology' future, such as for power conservation and energy efficiency in products that encompass a large portion of the US economy.

Note that embodiments described herein may be independent of and/or complementary to an operating system (OS)-based mechanism, such as the Advanced Configuration and Platform Interface (ACPI) standard (e.g., Rev. 3.0b, published Oct. 10, 2006). According to ACPI, a processor can operate at various performance states or levels, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic state in which, when power and/or thermal budget is available, processor hardware can configure the processor or at least portions thereof to operate at a higher than guaranteed frequency. In many implementations a processor can include multiple so-called bin frequencies above a guaranteed maximum frequency, also referred to as a P1 frequency. In addition, according to ACPI, a processor can operate at various power states or levels. With regard to power states, ACPI specifies different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Referring to FIG. 1A, shown is a block diagram of a system 100 in accordance with one or more embodiments. In some embodiments, the system 100 may be all or a portion of an electronic device or component. For example, the system 100 may be a cellular telephone, a computer, a server, a network device, a controller, an appliance, etc.

As shown in FIG. 1A, the system 100 may include a processor 101 coupled to a memory 108. The memory 108 may be any type of computer memory (e.g., dynamic random access memory (DRAM), static random-access memory (SRAM), etc.). As shown, in some embodiments, the processor 101 may be a multicore processor including multiple execution groups 102a-102n, each including a cache unit 105 and a core 106. For example, in some embodiments, the execution groups 102a-102n may be multiple tiles included within a single die of the processor 101.

In one or more embodiments, each cache unit 105 is private to its associated core 106. Further, in some embodiments, the cache unit 105 may correspond to a single cache level (e.g., a middle level cache of a cache hierarchy). Alternatively, in other embodiments, the cache unit 105 may represent a cache memory hierarchy having multiple cache levels (e.g., a three-level hierarchy with a low level cache, a middle level cache, and a high level cache).

As shown, in some embodiments, the processor 101 may also include a power control unit 107. In one or more embodiments, the power control unit 107 may include functionality to control or manage one or more power states of the processor 101 (or a portion thereof). For example, the power control unit 107 may cause an execution group 102 to enter a "sleep" state (e.g., a C6 state), meaning a power state in which the execution group 102 is not active, but which may require a shorter time to restore full functionality in comparison to a full shutdown of the execution group 102. In some embodiments, such a sleep state may provide a relatively high level of power savings in comparison to a normal power state (e.g., a C0 state).

Figure 1B:
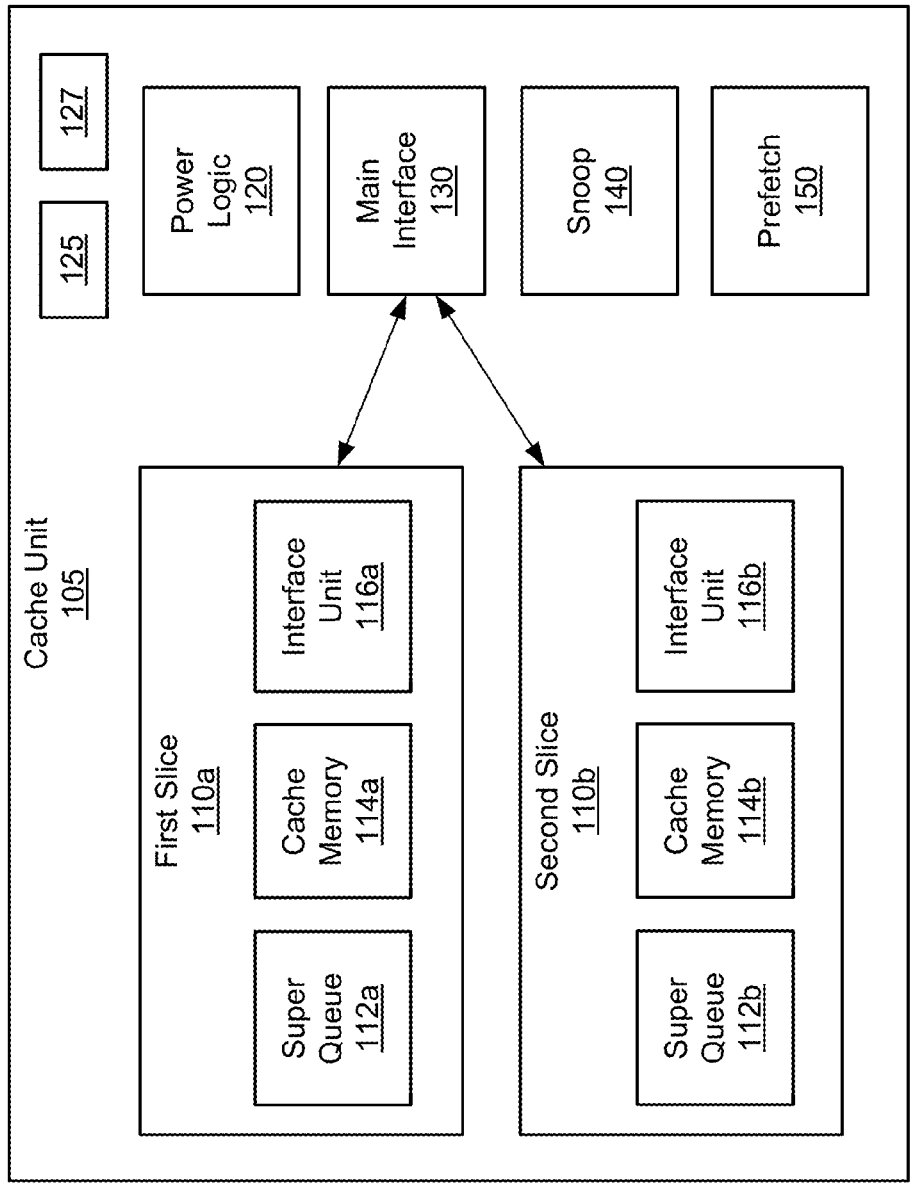

Referring now to FIG. 1B, shown is an example embodiment of the cache unit 105. As shown, the cache unit 105 may include various components, including a first slice 110a, a second slice 110b, power logic 120, a main interface unit 130, a snoop unit 140, a prefetch unit 150, configuration registers 125, and a cache counter 127.

In one or more embodiments, the main interface unit 130 may include functionality to handle communications between the cache unit 105 and other portions of the processor 101. For example, in some embodiments, the main interface unit 130 may provide one or more In-Die Interface (IDI) datapaths to the uncore portion of the processor 101, to another execution group 102, etc.

In some embodiments, the snoop unit 140 includes functionality to monitor data transfers in order to maintain cache coherency. Further, in some embodiments, the prefetch unit 150 includes functionality to prefetch data for use by the associated core 106.

In one or more embodiments, each slice 110 may be cache slice, meaning a portion of the cache unit 105 that may be independently written to and/or read from. As shown, each slice 110 may include a super queue 112, cache memory 114, and an interface unit 116. In some embodiments, the super queue 112 may include functionality to control and/or centralize access requests to the slice 110. For example, in some embodiments, the super 112 may include sixteen entries to track cache requests to the slice 110.

In some embodiments, the cache memory 114 may include a portion of the cache lines available in the cache unit 105 (e.g., 128K of cache memory). Further, in some embodiments, the cache memory 114 may include a cache controller (or some equivalent functionality).

In one or more embodiments, the interface unit 116 may include functionality to handle communications between the slice 110 and the cache unit 105. For example, in some embodiments, the interface unit 116 may be an IDI pipe to the main interface unit 130, and may include a data structure to track cache misses.

In one or more embodiments, the power logic 120 may include functionality to switch operation of the cache unit 105 between a two-slice mode and a one-slice mode. In some embodiments, the two-slice mode may involve using all cache slices of the cache unit 105 (e.g., using both the first slice 110a and the second slice 110b). The two-slice mode may also be referred to as a normal (or full-power) operating mode. In some embodiments, the one-slice mode may involve using only one cache slice, and disabling the other cache slice. For example, the one-slice mode may involve using the first slice 110a (or a portion thereof) and disabling the second slice 110b. The one-slice mode may also be referred to as a reduced power operating mode.

In some embodiments, a count may be initiated in the cache counter 127 when the cache unit 105 enters the one-slice mode. Once the cache counter 127 reaches a maximum count, the power logic 120 may switch the cache unit 105 from the one-slice mode to the two-slice mode. Alternatively, in some embodiments, the cache counter 127 may be initiated at the maximum level, and may be counted down to zero. For example, the cache counter 127 may be incremented for every processing cycle, for every instruction, etc.

Figure 2:
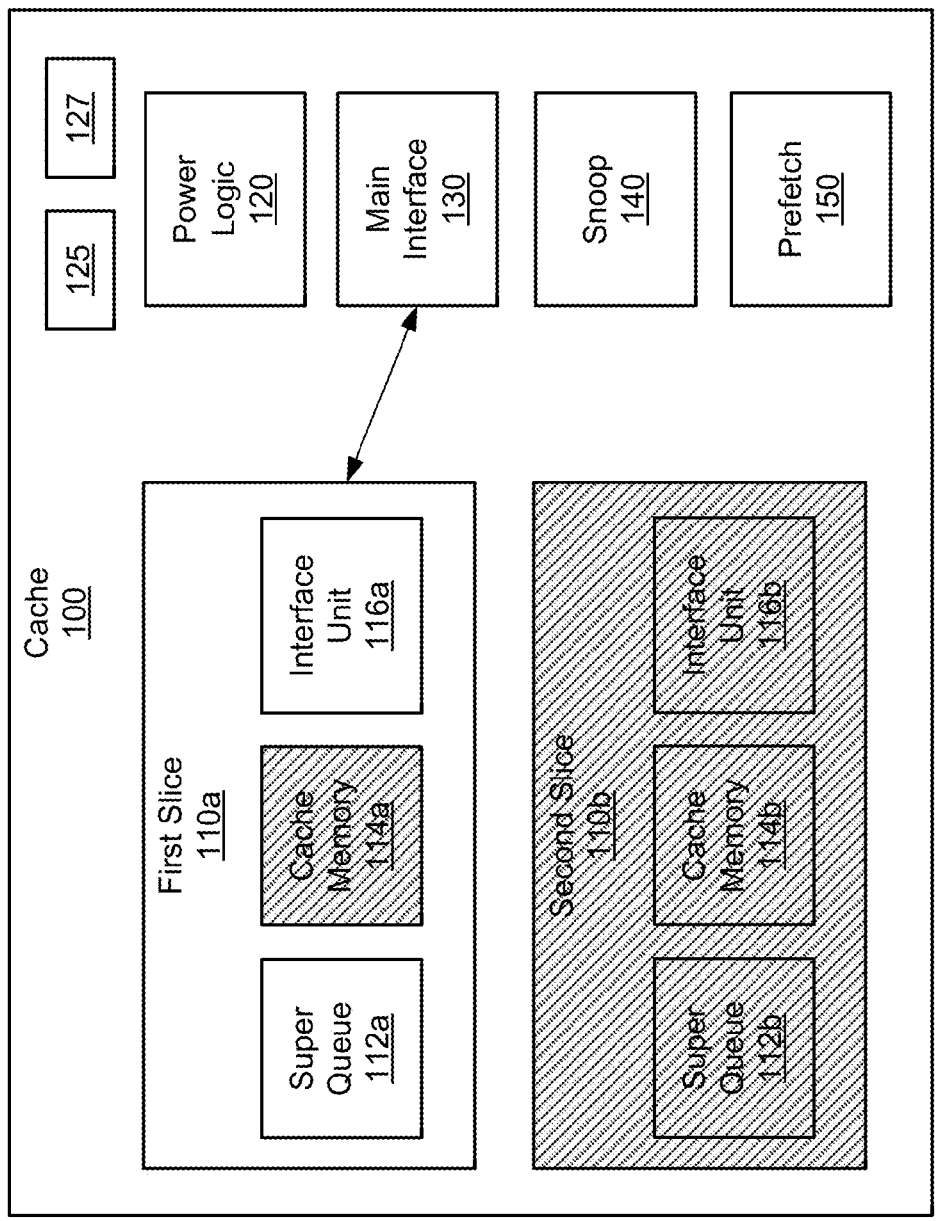
FIG. 2 is a block diagram in accordance with one or more embodiments.

Referring now to FIG. 2, shown is an example embodiment of the cache unit 105 when operating in one-slice mode. In the example of FIG. 2, the second slice 110b is shown with a cross-hatch pattern, indicating that the second slice 110b may be disabled in the one-slice mode. In some embodiments, disabling the second slice 110b may involve gating all power from the second slice 110b. Alternatively, in other embodiments, disabling the second slice 110b may involve freezing the state of the second slice 110b, and providing a relatively low power level to maintain the frozen state of the second slice 110b.

In one or more embodiments, at least some portion of the first slice 110a may not be disabled in the one-slice mode. For example, as shown in FIG. 2, the one-slice mode may involve disabling the cache memory 114a of the first slice 110a, but not disabling the super queue 112a and the interface unit 116a of the first slice 110a. In some embodiments, not disabling the super queue 112a and the interface unit 116a may enable the core 106 to function properly in the one-slice mode (e.g., to maintain data transfer to/from the core 106).

In one or more embodiments, operating in the one-slice mode may always result in a cache miss for the cache unit 105. Further, in some embodiments, operating in the one-slice mode may reduce the total power consumed by the cache unit 105. In some embodiments, the power logic 120 may include functionality to balance any performance loss due to cache misses against the power savings resulting from using the one-slice mode.

In one or more embodiments, the power logic 120 may switch the operating mode of the cache unit 105 based on a request from the power control unit 107. For example, in some embodiments, the power control unit 107 may generate a request to switch the operation of the cache unit 105. In response, the configuration registers 125 may be set to indicate that the request from the power control unit 107. For example, a single bit of the configuration registers 125 may be set to "0" to indicate a request for the two-slice mode, and may be set to "1" to indicate a request for the one-slice mode. The power logic 120 may then switch the operating mode of the cache unit 105 based on the settings of the configuration registers 125. In some embodiments, the power logic 120 may only switch the operating mode when "waking" (i.e., exiting) from a sleep state (e.g., a C6 state), after a reset of the processor 101, etc.

In one or more embodiments, the power control unit 107 may include functionality to determine a type of processing task expected to be performed by a given core 106. The power control unit 107 may then generate a request to switch operating modes of the cache unit 105 based on the determined type of processing task. This request may be provided to the power logic 120.

In one or more embodiments, the performance loss due to a cache miss for the cache unit 105 may be reduced when performing certain types of processing tasks in the core 106. For example, in some embodiments, the performance loss may be minimized when the type of processing task involves a high frequency of sleep states (e.g., a C6 state). Such types of processing tasks may include, e.g., video image processing.

In some embodiments, the power control unit 107 may generate a request to switch the cache unit 105 from two-slice mode to one-slice mode when the frequency of sleep states expected in the processing task meets and/or exceeds a threshold level. For example, assuming a threshold of eight sleep states per second, the power control unit 107 may request a switch to the one-slice mode if the expected frequency of sleep states in a scheduled task is nine or more sleep states per second. Further, in some embodiments, the power control unit 107 may generate a request to switch the cache unit 105 from one-slice mode to two-slice mode when the frequency of sleep states expected in a processing task again drops below the threshold level.

Figure 3A:
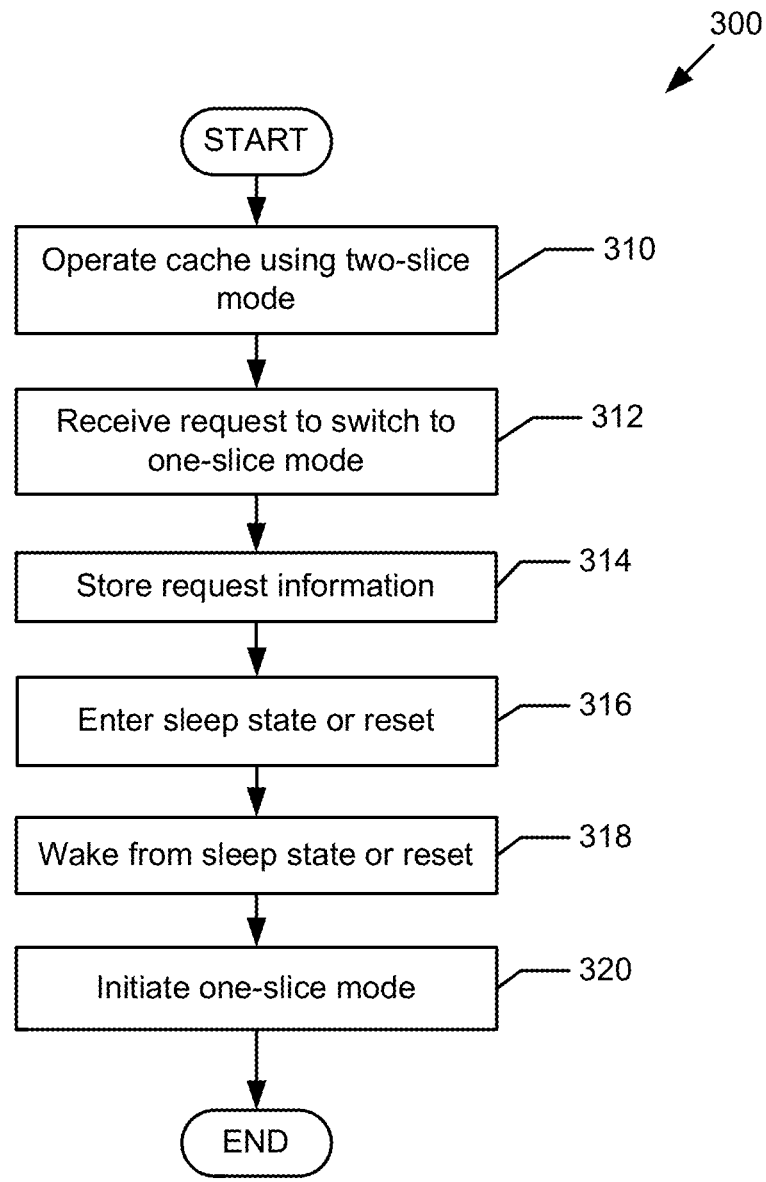
FIGS. 3A-3C are sequences in accordance with one or more embodiments.

Referring now to FIG. 3A, shown is a sequence 300 for switching to a one-slice mode, in accordance with one or more embodiments. In one or more embodiments, the sequence 300 may be part of the power logic 120 shown in FIG. 1B. The sequence 300 may be implemented in hardware, software, and/or firmware. In firmware and software embodiments it may be implemented by computer executed instructions stored in a non-transitory computer readable medium, such as an optical, semiconductor, or magnetic storage device.

At step 310, a cache unit may be operated in a two-slice mode. For example, referring to FIG. 1B, the cache unit 105 may be operated using both the first slice 110*a* and the second slice 110*b*.

At step 312, a request to switch the cache unit to a one-slice mode may be received. For example, referring to FIG. 1B, the power logic 120 may receive a request from the power control unit 107 to switch the cache unit 105 to a one-slice operating mode. In some embodiments, the power control unit 107 may generate this request based on one or more processing tasks expected to be performed by the core 106 associated with the cache unit 105.

At step 314, information related to the request (received at step 312) may be stored in the cache unit. For example, referring to FIG. 1B, one or more configuration registers 125 may be set to indicate that a request to switch the cache unit 105 to one-slice mode has been received.

At step 316, the cache unit may enter a sleep state or may be reset. For example, referring to FIG. 1B, the cache unit 105 may enter a sleep state (e.g., a C6 state), or may be reset.

At step 318, the cache unit may wake from the sleep state or reset. For example, referring to FIG. 1B, the cache unit 105 may enter a normal state (e.g., a C0 state) after waking from a sleep state or being reset.

At step 320, a one-slice mode may be initiated in the cache unit. For example, referring to FIG. 1B, the power logic 120 may read the configuration registers 125 after waking from a sleep state or reset, and may then switch the cache unit 105 to operate in the one-slice mode. In some embodiments, the one-slice mode may involve using only the first slice 110*a*, and disabling the second slice 110*b*. Further, in some embodiments, the one-slice mode may involve disabling the cache memory 114*a* of the first slice 110*a*, but not disabling the super queue 112*a* and the interface unit 116*a* of the first slice 110*a*. After step 320, the sequence 300 ends. Optionally, in some embodiments, steps 314, 316, and 318 may be omitted from the sequence 300. That is, in some embodiments, the one-slice mode may be initiated (step 320) upon receiving the request from the power control unit 107 (step 312).

Figure 3B:
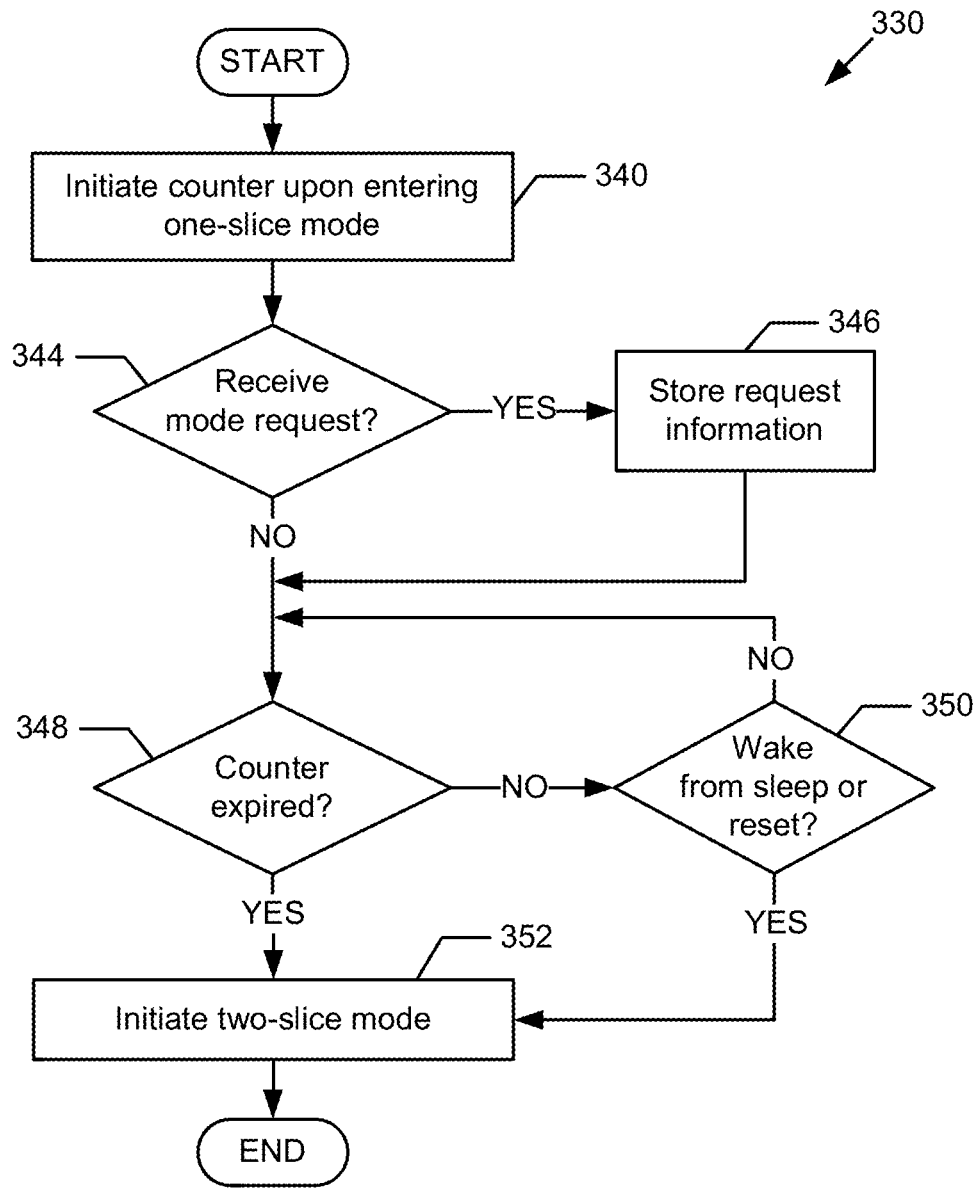

Referring now to FIG. 3B, shown is a sequence 330 for switching to a two-slice mode, in accordance with one or more embodiments. In one or more embodiments, the sequence 330 may be part of the power logic 120 shown in FIG. 1B. The sequence 330 may be implemented in hardware, software, and/or firmware. In firmware and software embodiments it may be implemented by computer executed instructions stored in a non-transitory computer readable medium, such as an optical, semiconductor, or magnetic storage device.

At step 340, a cache counter may be initiated upon entering a one-slice mode. For example, referring to FIG. 2, assume that the cache unit 105 is switched into the one-slice mode (e.g., after completing sequence 300 shown in FIG. 3A). In this example, a count may be initiated in the cache counter 127 when the cache unit 105 enters the one-slice mode. In some embodiments, the cache counter 127 may count up to a maximum count. Alternatively, in other embodiments, the cache counter 127 may count down to zero. The cache counter 127 may be incremented, e.g., for every processing cycle, for every instruction, etc.

At step 344, a determination about whether a request to switch the cache unit to the two-slice mode has been received is made. For example, referring to FIG. 2, the power logic 120 may determine whether a request to switch to the two-slice mode has been received from the power control unit 107.

If it is determined at step 344 that the request to switch to the two-slice mode has not been received, the sequence 330 may continue at step 348 (described below). However, if it is determined at step 344 that the request to switch to the two-slice mode has been received, then at step 346, information related to the request may be stored in the cache unit. For example, referring to FIG. 2, one or more configuration registers 125 may be set to indicate that a request to switch the cache unit 105 to two-slice mode has been received.

At step 348, a determination about whether the cache counter (initiated at step 340) has expired is made. For example, referring to FIG. 2, the power logic 120 may determine whether the cache counter 127 has reached the maximum count (or has counted down to zero).

If it is determined at step 348 that the cache counter has expired, the sequence 330 may continue at step 352 (described below). However, if it is determined at step 348 that the cache counter has not expired, then at step 350, a determination about whether the cache unit has awakened (i.e., exited) from a sleep state or reset is made. For example, referring to FIG. 2, the power logic 120 may determine whether the cache unit 105 has exited from a sleep state (e.g., a C6 state) or a reset.

If it is determined at step 350 that the cache unit has not awakened from a sleep state or reset, then the sequence 300 may return to step 348 to again determine whether the cache counter has expired. However, if it is determined at step 350 that the cache unit has awakened from a sleep state or reset, then at step 352, the two-slice mode may be initiated in the cache unit. For example, referring to FIG. 2, the power logic 120 may switch the cache unit 105 to operate in the two-slice mode (i.e., using both the first slice 110*a* and the second slice 110*b*). After step 352, the sequence 330 ends.

Figure 3C:
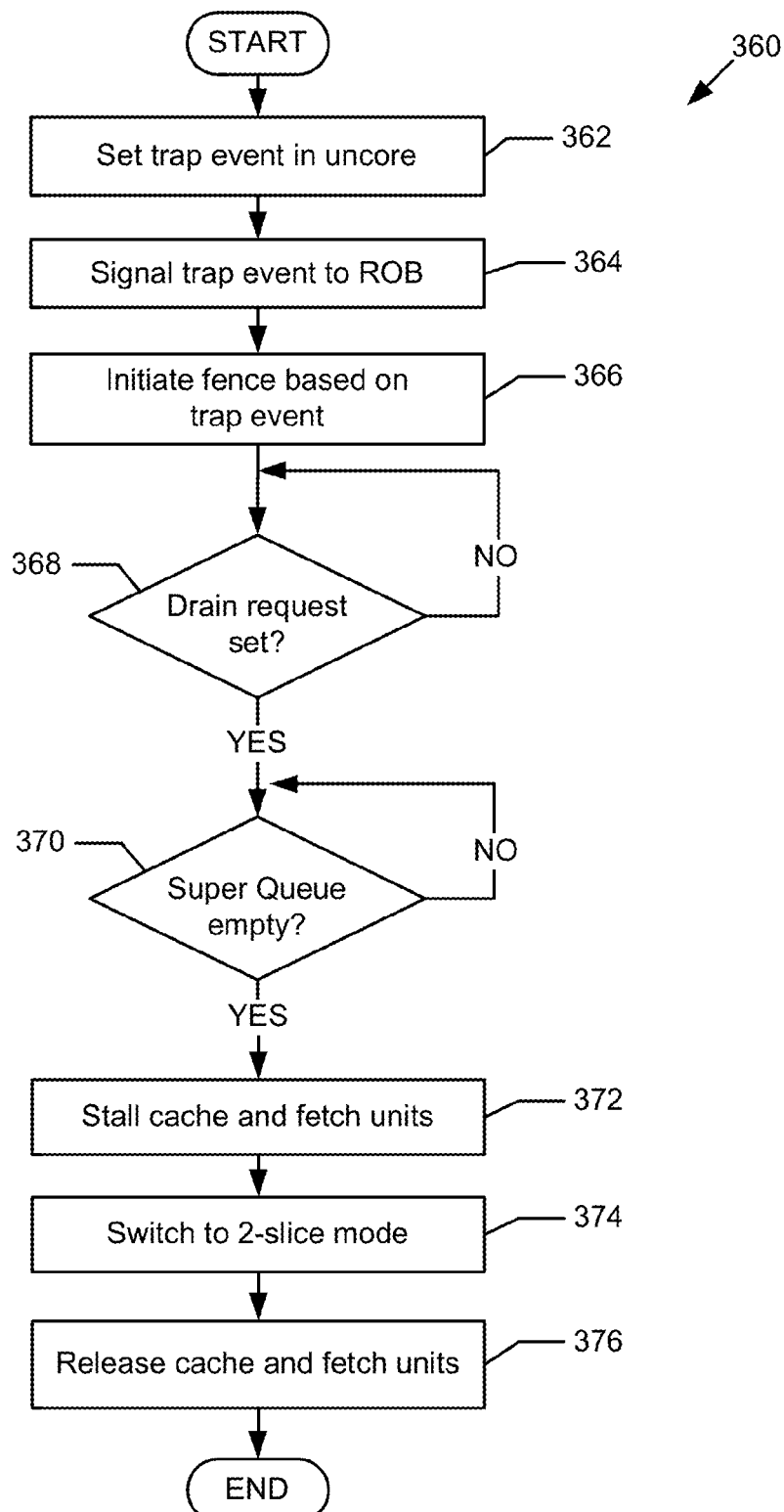

Referring now to FIG. 3C, shown is a sequence 360 for initiating a two-slice mode, in accordance with one or more embodiments. In particular, the sequence 360 illustrates an exemplary expansion of step 352 (shown in FIG. 3B). The sequence 360 may be implemented in hardware, software, and/or firmware. In firmware and software embodiments it may be implemented by computer executed instructions stored in a non-transitory computer readable medium, such as an optical, semiconductor, or magnetic storage device.

At step 362, a trap event may be set in an uncore portion of a processor (e.g., processor 101 shown in FIG. 1A). At step 364, the trap event may be signaled to a re-order buffer (ROB) of the processor. At step 366, a fence may be initiated based on the trap event. At step 368, a determination about whether a drain request is set is made. If it is determined at step 368 that the drain request is not set, then the sequence 360 may return to step 368 to again determine whether the drain request is set. However, if it is determined at step 368 that the drain request is set, then at step 370, a determination about whether the super queue (e.g., super queue 112 shown in FIG. 1B) is empty is made.

If it is determined at step 370 that the super queue is not empty, then the sequence 360 may return to step 370 to again determine whether the super queue is empty. However, if it is determined at step 370 that the super queue is empty, then at step 372, the cache unit (e.g., cache unit 105 shown in FIG. 1B) and the instruction fetch unit may be stalled.

At step 374, the cache unit (e.g., cache unit 105 shown in FIG. 1B) may be switched to a two-slice mode. At step 376, the cache unit and the instruction fetch unit may be released. After step 374, the sequence 360 ends.

Note that the examples shown in FIGS. 1A-1B, 2, and 3A-3C are provided for the sake of illustration, and are not intended to limit any embodiments. For instance, while embodiments may be shown in simplified form for the sake of clarity, embodiments may include any number and/or arrangement of processors, cores, and/or additional components (e.g., buses, storage media, connectors, power components, buffers, interfaces, etc.). In particular, it is contemplated that, in some embodiments, the cache unit 105 may include any number of slices 101. In such embodiments, operating in one-slice mode may involve disabling a sub-portion of the slices 101 included in the cache unit 105. It is further contemplated that specifics in the examples shown in FIGS. 1A-1B, 2, and 3A-3C may be used anywhere in one or more embodiments.

Figure 4:
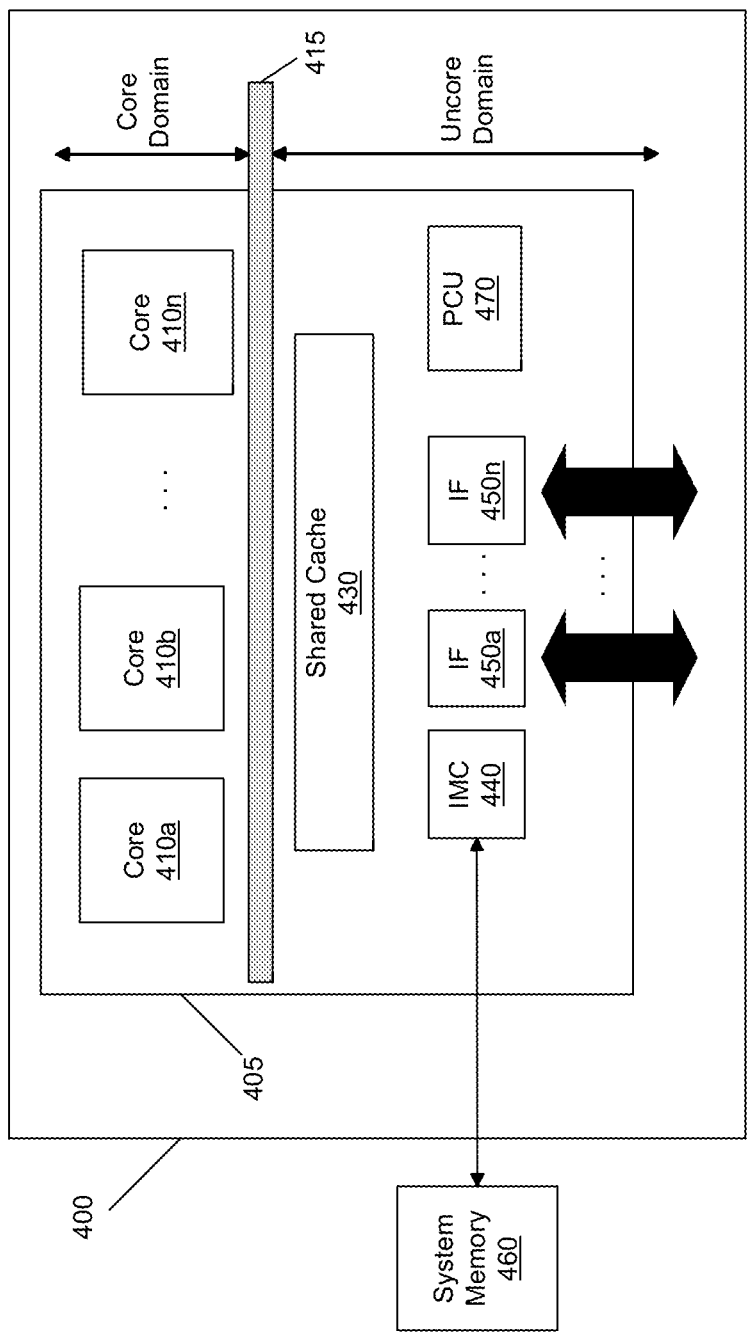
FIG. 4 is a block diagram of a processor in accordance with an embodiment of the present invention.

Referring now to FIG. 4, shown is a block diagram of a processor in accordance with an embodiment of the present invention. As shown in FIG. 4, the processor 400 may be a multicore processor including first die 405 having a plurality of cores 410a-410n of a core domain. The various cores 410a-410n may be coupled via an interconnect 415 to a system agent or uncore domain 420 that includes various components. As seen, the uncore domain 420 may include a shared cache 430. In addition, the uncore may include an integrated memory controller 440, a power control unit (PCU) 470, and various interfaces 450. The PCU 470 may include some or all of the functionality of the power control unit 107 described above with reference to FIG. 1A. Further, although not shown for ease of illustration in FIG. 4, in some embodiments, each of the cores 410a-410n may be associated with a cache unit 105 shown in FIGS. 1A-1B and 2.

With further reference to FIG. 4, the processor 400 may communicate with a system memory 460, e.g., via a memory bus. In addition, by interfaces 450, connection can be made to various off-package components such as peripheral devices, mass storage and so forth. While shown with this particular implementation in the embodiment of FIG. 4, the scope of the present invention is not limited in this regard.

Figure 5:
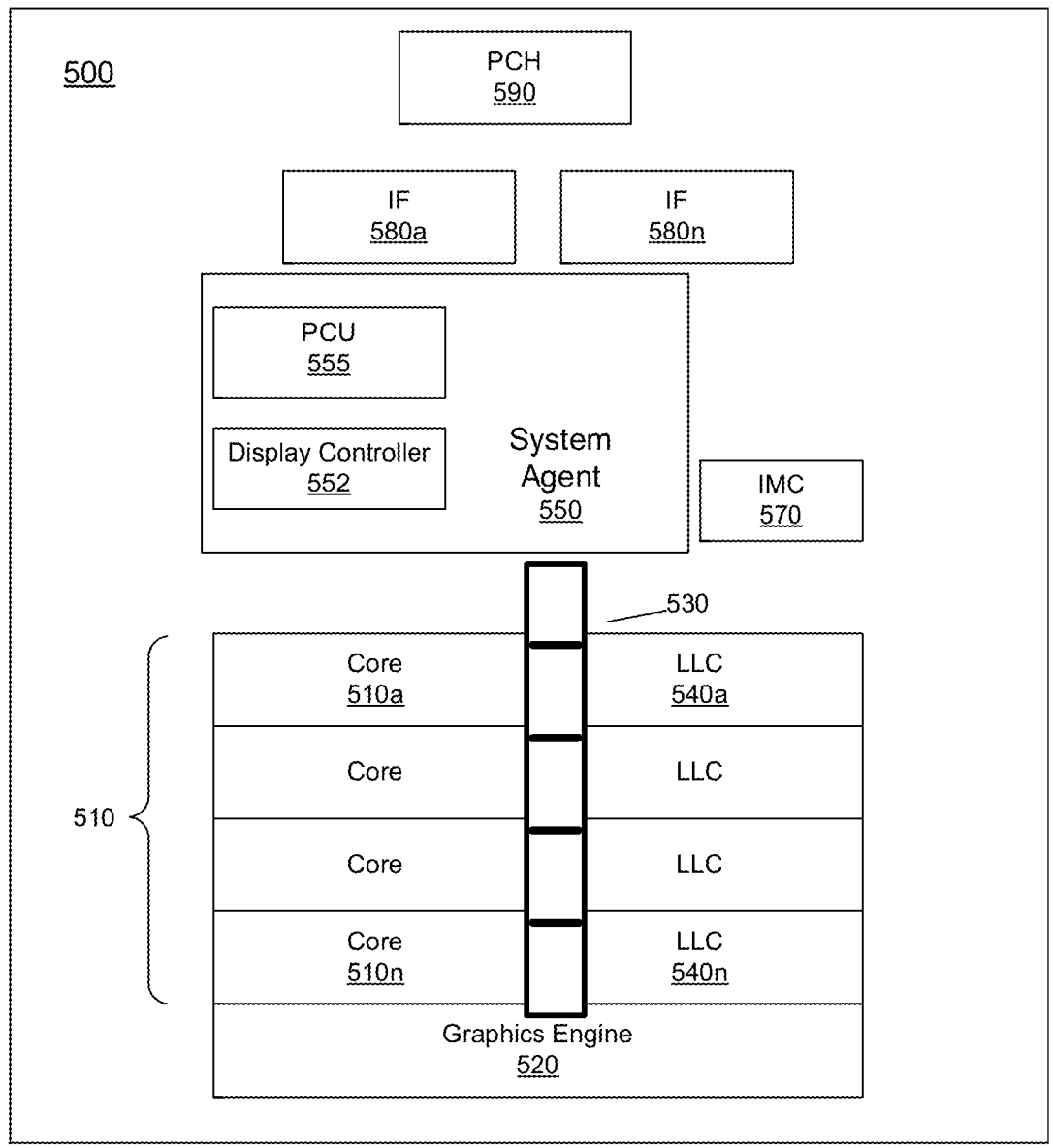
FIG. 5 is a block diagram of a multi-domain processor in accordance with another embodiment of the present invention.

Referring now to FIG. 5, shown is a block diagram of a multi-domain processor in accordance with another embodiment of the present invention. As shown in the embodiment of FIG. 5, processor 500 includes multiple domains. Specifically, a core domain 510 can include a plurality of cores 510a-510n, a graphics domain 520 can include one or more graphics engines, and a system agent domain 550 may further be present. Note that while only shown with three domains, understand the scope of the present invention is not limited in this regard and additional domains can be present in other embodiments. For example, multiple core domains may be present each including at least one core.

In general, each core 510 may further include low level caches in addition to various execution units and additional processing elements. In turn, the various cores may be coupled to each other and to a shared cache memory formed of a plurality of units of a last level cache (LLC) 540a-540n. In various embodiments, LLC 540 may be shared amongst the cores and the graphics engine, as well as various media processing circuitry. In some embodiments, each of the LLCs 540a-540n may include some or all of the functionality and/or components of the cache unit 105 shown in FIGS. 1A-1B and 2.

As seen, a ring interconnect 530 thus couples the cores together, and provides interconnection between the cores, graphics domain 520 and system agent circuitry 550. In the embodiment of FIG. 5, system agent domain 550 may include display controller 552 which may provide control of and an interface to an associated display. As further seen, system agent domain 550 may also include a power control unit 555 to allocate power to the CPU and non-CPU domains. In some embodiments, the power control unit 555 may include some or all of the functionality of the power control unit 107 shown in FIG. 1A.

As further seen in FIG. 5, processor 500 can further include an integrated memory controller (IMC) 570 that can provide for an interface to a system memory, such as a dynamic random access memory (DRAM). Multiple interfaces 580a-580n may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. As further seen, a peripheral controller hub (PCH) 590 may also be present within the processor 500, and can be implemented on a separate die, in some embodiments. Alternatively, in some embodiments, the PCH 590 may be external to the processor 500. Although shown at this high level in the embodiment of FIG. 5, understand the scope of the present invention is not limited in this regard.

Figure 6:
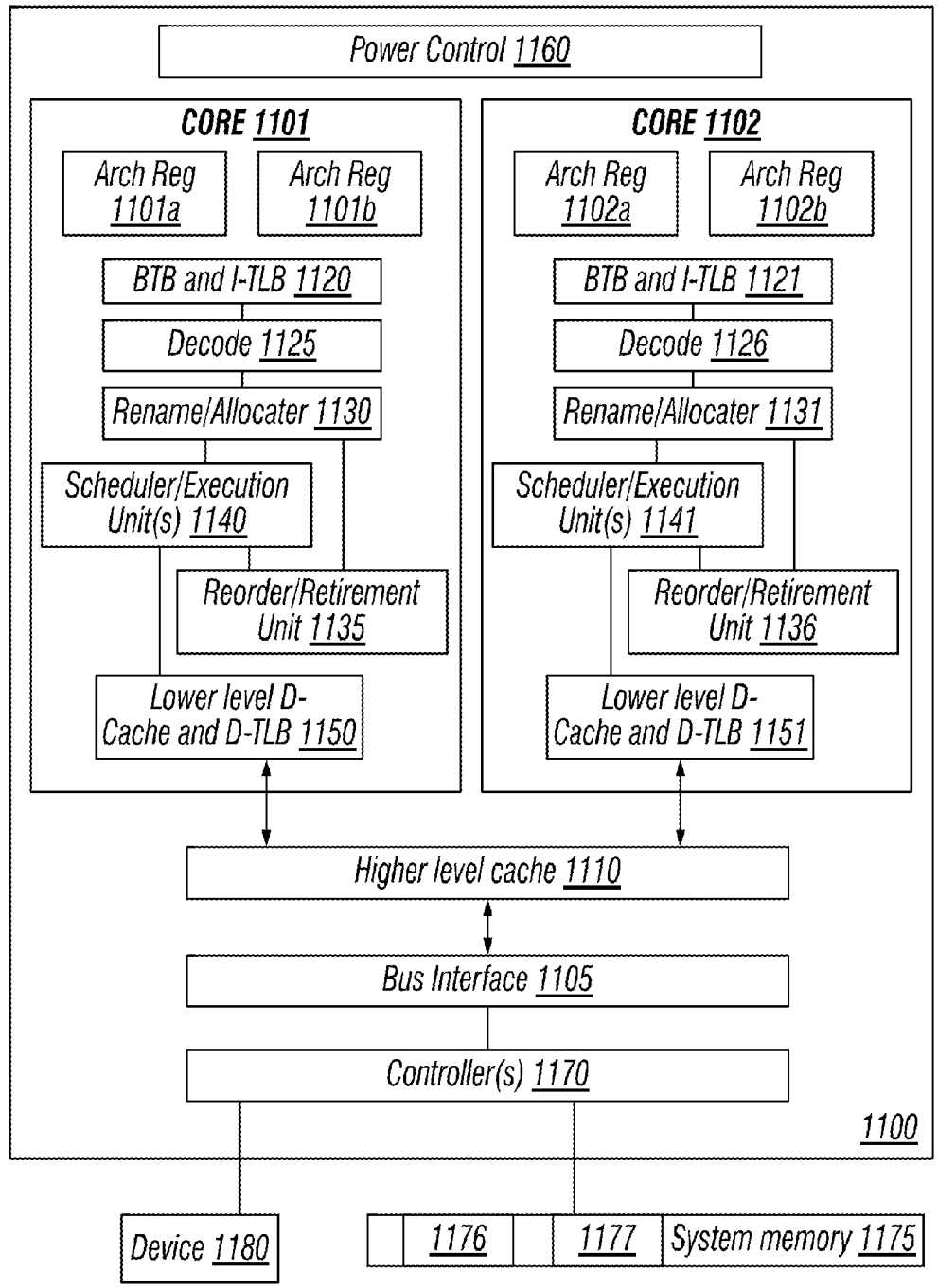
FIG. 6 is a block diagram of an embodiment of a processor including multiple cores.

Referring to FIG. 6, an embodiment of a processor including multiple cores is illustrated. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—cores 1101 and 1102, which may include asymmetric cores or symmetric cores (the illustrated embodiment). However, processor 1100 may include any number of processing elements that may be symmetric or asymmetric. Although not shown for ease of illustration in FIG. 6, in some embodiments, each of the cores 1101 and 1102 may be associated with a cache unit 105 shown in FIGS. 1A-1B and 2.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 6, includes two cores, cores 1101 and 1102. Here, cores 1101 and 1102 are considered symmetric cores, i.e. cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 1101 are described in further detail below, as the units in core 1102 operate in a similar manner.

As shown, core 1101 includes two hardware threads 1101*a* and 1101*b*, which may also be referred to as hardware thread slots 1101*a* and 1101*b*. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101*a*, a second thread is associated with architecture state registers 1101*b*, a third thread may be associated with architecture state registers 1102*a*, and a fourth thread may be associated with architecture state registers 1102*b*. Here, each of the architecture state registers (1101*a*, 1101*b*, 1102*a*, and 1102*b*) may be referred to as processing elements, thread slots, or thread units, as described above.

As illustrated, architecture state registers 1101*a* are replicated in architecture state registers 1101*b*, so individual architecture states/contexts are capable of being stored for logical processor 1101*a* and logical processor 1101*b*. In core 1101, other smaller resources, such as instruction pointers and renaming logic in allocator and renamer block 1130 may also be replicated for threads 1101*a* and 1101*b*. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 6, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101*a*, 1101*b*, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. As a result of the recognition by decoders 1125, the architecture or core 1101 takes specific, predefined actions to perform tasks associated with the appropriate instruction (e.g., one or more of the actions shown in FIGS. 3A-3C). It is important to note that any of the tasks, blocks, operations, and methods described herein may be performed in response to a single or multiple instructions; some of which may be new or old instructions.

In one example, allocator and renamer block 1130 includes an allocator to reserve resources, such as register files to store instruction processing results. However, threads 1101*a* and 1101*b* are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1101 and 1102 share access to higher-level or further-out cache 1110, which is to cache recently fetched elements. Note that higher-level or further-out refers to cache levels increasing or getting further away from the execution unit(s). In one embodiment, higher-level cache 1110 is a last-level data cache—last cache in the memory hierarchy on processor 1100—such as a second or third level data cache. However, higher level cache 1110 is not so limited, as it may be associated with or includes an instruction cache. A trace cache—a type of instruction cache—instead may be coupled after decoder 1125 to store recently decoded traces.

In the depicted configuration, processor 1100 also includes bus interface module 1105 and a power controller 1160, which may perform power sharing control in accordance with an embodiment of the present invention. In some embodiments, the power controller 1160 may include some or all of the functionality of the power control unit 107 shown in FIG. 1A.

Historically, controller 1170 has been included in a computing system external to processor 1100. In this scenario, bus interface 1105 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 1170 is illustrated as part of processor 1100. Recently, as more logic and devices are being integrated on a single die, such as SOC, each of these devices may be incorporated on processor 1100. For example in one embodiment, memory controller hub 1170 is on the same package and/or die with processor 1100. Here, a portion of the core (an on-core portion) includes one or more controller(s) 1170 for interfacing with other devices such as memory 1175 or a graphics device 1180. The configuration including an interconnect and controllers for interfacing with such devices is often referred to as an on-core (or un-core configuration). As an example, bus interface 1105 includes a ring interconnect with a memory controller for interfacing with memory 1175 and a graphics controller for interfacing with graphics processor 1180. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

Figure 7:
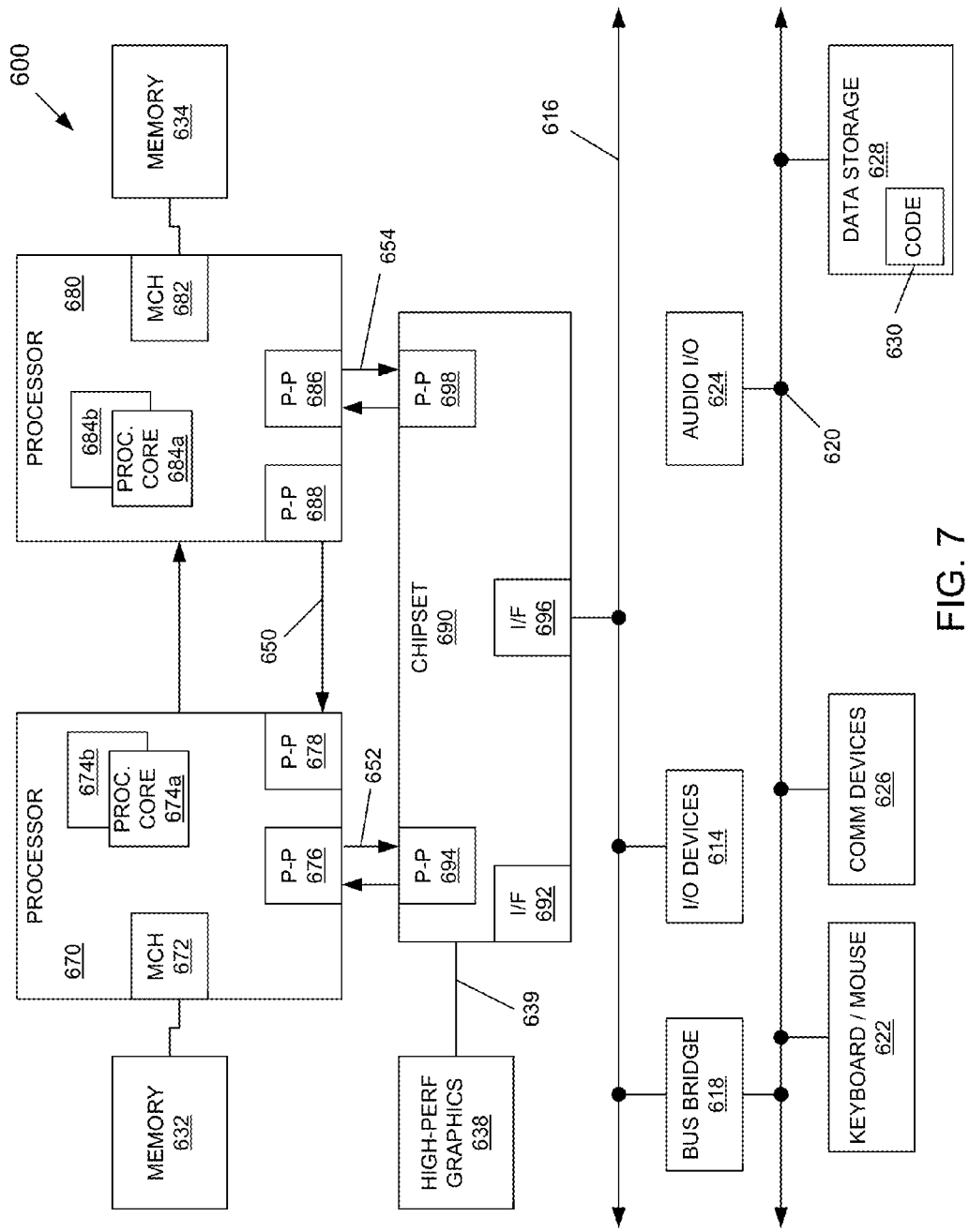
FIG. 7 is a block diagram of a system in accordance with an embodiment of the present invention.

Embodiments may be implemented in many different system types. Referring now to FIG. 7, shown is a block diagram of a system in accordance with an embodiment of the present invention. As shown in FIG. 7, multiprocessor system 600 is a point-to-point interconnect system, and includes a first processor 670 and a second processor 680 coupled via a point-to-point interconnect 650. As shown in FIG. 7, each of processors 670 and 680 may be multicore processors, including first and second processor cores (i.e., processor cores 674a and 674b and processor cores 684a and 684b), although potentially many more cores may be present in the processors. Each of these processors can include any part of the central power controller 110 and/or the block power logic 130 described above with reference to FIG. 1. Although not shown for ease of illustration in FIG. 6, in some embodiments, each of the processor cores 674, 684 may be associated with one of the cache units 105 shown in FIGS. 1A-1B and 2.

Still referring to FIG. 7, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 7, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 652 and 654, respectively. As shown in FIG. 7, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 7, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, Ultrabook™, or so forth.

It should be understood that a processor core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

Any processor described herein may be a general-purpose processor, such as a Core™ i3, i5, i7, 2 Duo and Quad, Xeon™, Itanium™, XScale™ or StrongARM™ processor, which are available from Intel Corporation, of Santa Clara, Calif. Alternatively, the processor may be from another company, such as ARM Holdings, Ltd, MIPS, etc. The processor may be a special-purpose processor, such as, for example, a network or communication processor, compression engine, graphics processor, co-processor, embedded processor, or the like. The processor may be implemented on one or more chips. The processor may be a part of and/or may be implemented on one or more substrates using any of a number of process technologies, such as, for example, BiCMOS, CMOS, or NMOS.

It is contemplated that the processors described herein are not limited to any system or device. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

The following clauses and/or examples pertain to further embodiments. In one example embodiment may be a processor may include a plurality of cores and a cache unit reserved for a first core of the plurality of cores. The cache unit may include a first cache slice, a second cache slice, and power logic to switch operation of the cache unit between a first operating mode and a second operating mode. The first operating mode may include use of both the first cache slice and the second cache slice. The second operating mode may include use of the first cache slice and disabling the second cache slice.

In an example, each cache slice may include a queue, a cache memory, and an interface unit.

In an example, the second operating mode may include disabling the cache memory of the first cache slice.

In an example, in the second operating mode, the first cache slice may return a cache miss.

In an example, the processor may include a power control unit to generate a request to switch the operation of the cache unit.

In an example, the power control unit may be to generate the request based on a type of processing task expected to be performed by the first core.

In an example, the power logic may be to, in response to the request, set at least one configuration register to indicate that the cache unit is to switch to a different operating mode.

In an example, the request may be to switch from the first operating mode to the second operating mode, and the power logic may be further to: set the at least one configuration register to indicate that the cache unit is to switch to the second operating mode, and upon exiting a sleep state, switch from the first operating mode to the second operating mode.

In an example, the request may be to switch from the second operating mode to the first operating mode, and the power logic may be further to: set the at least one configuration register to indicate that the cache unit is to switch to the first operating mode, and upon exiting a sleep state, switch from the second operating mode to the first operating mode.

In an example, the power logic may be further to, upon switching to the second operating mode, initiate a count in a cache counter. In an example, the power logic may be further to, when the cache counter reaches a maximum count, switch from the second operating mode to the first operating mode.

In another example embodiment may be a system, the system including a multicore processor and a dynamic random access memory (DRAM) coupled to the multicore processor. The multicore processor may include a plurality of tiles, each tile including a core and a cache unit, where the cache unit is private to the tile. Each cache unit may include: a first cache slice, a second cache slice, and power logic to switch operation of the cache unit between a first operating mode and a second operating mode. The cache unit may be to use the first cache slice and the second cache slice in the first operating mode. The cache unit may be to disable the second cache slice in the second operating mode.

In an example, the second operating mode includes disabling a cache memory portion of the first cache slice.

In an example, the multicore processor further includes a power control unit to generate a request to switch the operation of the cache unit between the first operating mode and the second operating mode. In an example, the power control unit may be to generate the request when a frequency of sleep states expected in a processing task exceeds a threshold level. In an example, the processing task may be video processing.

In another example embodiment may be a method, the method including: receiving, by power logic included in a cache unit of a processor, a first request to switch the cache unit from a first operating mode to a second operating mode, where the cache unit comprises a first cache slice and a second cache slice; and, in response to the first request, initiating the second operating mode in the cache unit, the second operating mode including use of the first cache slice and disabling the second cache slice.

In an example, initiating the second operating mode may include: in response to the request, setting at least one configuration register to indicate receipt of the first request from a power control unit; and, upon waking from a sleep state, initiating the second operating mode in the cache unit based on the at least one configuration register.

In an example, the method may further include, upon initiating the second operating mode in the cache unit: initiating a cache counter to perform a count; and upon reaching a maximum count in the cache counter, switching the cache unit to the first operating mode, the first operating mode including use of both the first cache slice and the second cache slice.

In an example, the method may further include generating the request based on a type of processing task to be performed by a core associated with the cache unit. In an example, the processing task is video processing.

In an example, the method may further include generating the first request when a frequency of sleep states expected in a processing task exceeds a threshold level.

In an example, the second operating mode may include disabling a cache memory portion of the first cache slice.

In another example embodiment may be a communication device may be arranged to perform the method of any of the above examples.

In another example embodiment may be at least one machine readable medium may include a plurality of instructions that in response to being executed on a computing device, cause the computing device to carry out the method of any of the above examples.

In another example embodiment may be an apparatus for processing instructions is configured to perform the method of any of the above examples.

In another example embodiment may be an apparatus comprising means for performing the method of any of the above examples.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments for the sake of illustration, those skilled in the art will appreciate numerous modifications and variations therefrom. It is intended that the appended claims cover all such modifications and variations as fall within the true spirit and scope of this present invention.

What is claimed is:

1. A processor comprising:
   a plurality of cores; and
   a cache unit reserved for a first core of the plurality of cores, the cache unit comprising a first cache slice, a second cache slice, and power logic to switch operation of the cache unit between a first operating mode and a second operating mode,
   wherein each cache slice comprises a queue, a cache memory, and an interface unit,
   wherein the first operating mode comprises use of both the first cache slice and the second cache slice, and
   wherein the second operating mode comprises use of the first cache slice disabling the second cache slice, and disabling the cache memory of the first cache slice.

2. The processor of claim 1, wherein the second operating mode further comprises:
   not disabling the queue and the interface unit of the first cache slice.

3. The processor of claim 1, wherein, in the second operating mode, the first cache slice returns a cache miss.

4. The processor of claim 1, wherein the processor further comprises a power control unit to generate a request to switch the operation of the cache unit.

5. The processor of claim 4, wherein the power control unit is to generate the request based on a type of processing task expected to be performed by the first core.

6. The processor of claim 4, wherein the power logic is to, in response to the request, set at least one configuration register to indicate that the cache unit is to switch to a different operating mode.

7. The processor of claim 6, wherein the request is to switch from the first operating mode to the second operating mode, and wherein the power logic is further to:
   set the at least one configuration register to indicate that the cache unit is to switch to the second operating mode, and
   upon exiting a sleep state, switch from the first operating mode to the second operating mode.

8. The processor of claim 6, wherein the request is to switch from the second operating mode to the first operating mode, and wherein the power logic is further to:
   set the at least one configuration register to indicate that the cache unit is to switch to the first operating mode, and
   upon exiting a sleep state, switch from the second operating mode to the first operating mode.

9. The processor of claim 1, wherein the power logic is further to, upon switching to the second operating mode, initiate a count in a cache counter.

10. The processor of claim 9, wherein the power logic is further to, when the cache counter reaches a maximum count, switch from the second operating mode to the first operating mode.

11. A system comprising:
    a multicore processor having a plurality of tiles, each tile including a core and a cache unit, wherein the cache unit is private to the tile, each cache unit comprising:
       a first cache slice;
       a second cache slice, wherein the first cache slice and the second cache slice each comprise a queue, a cache memory, and an interface unit; and
       power logic to switch operation of the cache unit between a first operating mode and a second operating mode, wherein the cache unit is to use the first cache slice and the second cache slice in the first operating mode, and wherein the cache unit is to, in the second operating mode:
          disable the second cache slice,
          use the first cache slice, and
          disable the cache memory of the first cache slice; and
    a dynamic random access memory (DRAM) coupled to the multicore processor.

12. The system of claim 11, wherein the second operating mode comprises:
    not disabling the queue and the interface unit of the first cache slice.

13. The system of claim 11, the multicore processor further comprising a power control unit to generate a request to switch the operation of the cache unit between the first operating mode and the second operating mode.

14. The system of claim 13, wherein the power control unit is to generate the request when a frequency of sleep states expected in a processing task exceeds a threshold level.

15. The system of claim 14, wherein the processing task is video processing.

16. A method, comprising:
    receiving, by power logic included in a cache unit of a processor, a first request to switch the cache unit from a first operating mode to a second operating mode, wherein the cache unit comprises a first cache slice and a second cache slice, wherein the first cache slice and the second cache slice each include a queue, a cache memory, and an interface unit;
    in response to the first request, initiating the second operating mode in the cache unit, the second operating mode including use of the first cache slice, disabling the second cache slice, and disabling the cache memory of the first cache slice.

17. The method of claim 16, wherein initiating the second operating mode comprises:
    in response to the request, setting at least one configuration register to indicate receipt of the first request from a power control unit; and
    upon waking from a sleep state, initiating the second operating mode in the cache unit based on the at least one configuration register.

18. The method of claim 16, further comprising, upon initiating the second operating mode in the cache unit:
    initiating a cache counter to perform a count; and
    upon reaching a maximum count in the cache counter, switching the cache unit to the first operating mode, the first operating mode comprising use of both the first cache slice and the second cache slice.

19. The method of claim 16, further comprising:
    generating the request based on a type of processing task to be performed by a core associated with the cache unit.

20. The method of claim 16, wherein the second operating mode includes:
    not disabling the queue and the interface unit of the first cache slice.

* * * * *